United States Patent
Kouda et al.

(10) Patent No.: US 7,631,056 B2
(45) Date of Patent: Dec. 8, 2009

(54) COMMUNICATION SERVER SWITCHING CONTROLLER

(75) Inventors: Toshihiko Kouda, Sagamihara (JP); Yoshihiko Nakakoji, Hiratsuka (JP)

(73) Assignee: Komatsu Ltd., Electronics Business Unit (JP)

( * ) Notice: Subject to any disclaimer, the term of this patent is extended or adjusted under 35 U.S.C. 154(b) by 852 days.

(21) Appl. No.: 10/738,868

(22) Filed: Dec. 16, 2003

(65) Prior Publication Data

US 2004/0162907 A1 Aug. 19, 2004

(30) Foreign Application Priority Data

Dec. 19, 2002 (JP) .............................. 2002-368597

(51) Int. Cl.
*G06F 15/177* (2006.01)
*G06F 15/173* (2006.01)

(52) U.S. Cl. ..................................... 709/220; 709/223

(58) Field of Classification Search ......... 709/220–225, 709/227, 245–246, 248
See application file for complete search history.

(56) References Cited

U.S. PATENT DOCUMENTS

| | | | |
|---|---|---|---|
| 5,278,759 A | 1/1994 | Berra et al. | |
| 5,442,553 A | 8/1995 | Parrillo | |
| 5,479,157 A | 12/1995 | Suman et al. | |
| 6,324,571 B1 * | 11/2001 | Hacherl | 709/208 |
| 6,397,282 B1 | 5/2002 | Hashimoto et al. | |
| 6,449,734 B1 * | 9/2002 | Shrivastava et al. | 714/15 |
| 6,751,674 B1 * | 6/2004 | Satagopan et al. | 709/249 |
| 6,782,313 B1 | 8/2004 | Frech et al. | |
| 6,820,133 B1 * | 11/2004 | Grove et al. | 709/238 |

(Continued)

FOREIGN PATENT DOCUMENTS

JP 05-316116 11/1993

(Continued)

OTHER PUBLICATIONS

Office Action which issued in the corresponding Chinese Patent Application, citing the above Japanese reference (with English translation of the reference).

(Continued)

*Primary Examiner*—Ario Etienne
*Assistant Examiner*—Hussein Elchanti
(74) *Attorney, Agent, or Firm*—Baker Hostetler, LLP

(57) ABSTRACT

The server switching controller system of the present invention includes a first server (2) and a second server (3) connected to a common controller (30, 20) installed in a vehicle (50) via communication means (14, 15, 8, 9, 10, and 11) to freely communicate with each other with said first server (2) and said second server (3) each having a server ID and an address (ID1 and ID2) for identifying itself; and with the controller (30, 20) having a controller ID and an address ID3 corresponding to the first server ID or an address ID4 corresponding to the second server ID, respectively such that the controller (30, 20) in the vehicle 50 will be connected either to first server (2) or to the second server (3) based on the address of the first server (2) or second server (3) respectively and program means for switching the address setting in the controller to permit the controller to selectively communicate with either the first or second server so as to operate either in a normal mode or in an overwrite mode.

3 Claims, 9 Drawing Sheets

Server - Construction Machine Relations

U.S. PATENT DOCUMENTS

| | | | |
|---|---|---|---|
| 7,010,303 B2 * | 3/2006 | Lewis et al. | 455/445 |
| 7,076,567 B1 * | 7/2006 | Chasman et al. | 709/248 |
| 7,080,372 B1 * | 7/2006 | Cole | 717/173 |
| 7,149,530 B1 * | 12/2006 | Arakawa et al. | 455/456.1 |
| 7,158,797 B1 * | 1/2007 | Jayaraman et al. | 455/456.1 |
| 2004/0122537 A1 | 6/2004 | Kouda et al. | |

FOREIGN PATENT DOCUMENTS

| | | |
|---|---|---|
| JP | 9-171459 | 6/1997 |
| JP | 10-212739 | 8/1998 |
| JP | 10212739 | 8/1998 |
| JP | 2000-214919 | 8/2000 |
| JP | 1302015 | 7/2001 |
| JP | 2002-006856 | 1/2002 |
| JP | 2002-202895 | 7/2002 |
| JP | 2002-202895 A | 7/2002 |
| WO | WO 98/28873 | 7/1998 |
| WO | WO 02/48859 | 6/2002 |

OTHER PUBLICATIONS

European Search Report citing the above U.S., Japanese and PCT references as well as the below cited non-patent literature reference. Proceedings Of The IEEE Intelligent Vehicles Symposium 2000, Dearborn MI, Oct. 3-5, 2000, pp. 93-98.

Office Action as issued in the corresponding U.S. Appl. No. 10/732,851 (Publication No. US 2004/0122537 A1 listed above) citing the above references.

* cited by examiner

FIGURE 1: Overall Configuration of an Embodiment of the Present Invention
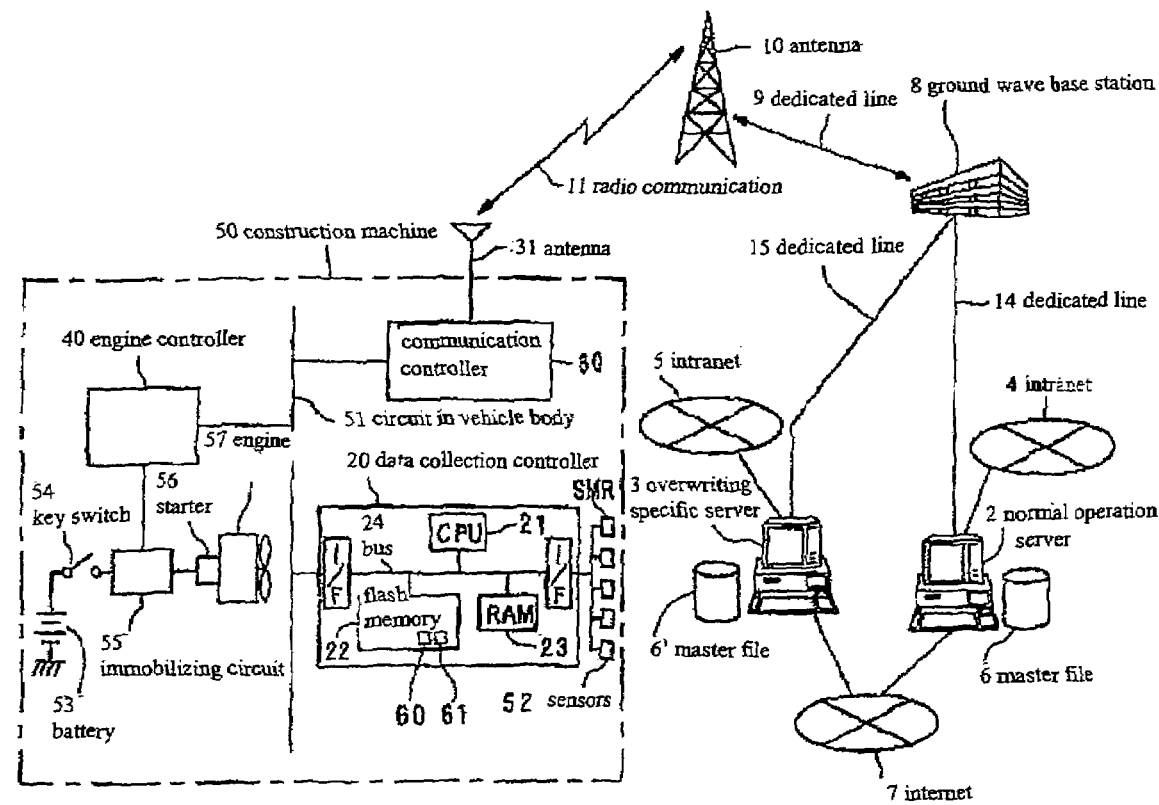

FIGURE 2: Diagram Showing the Overwriting Procedure
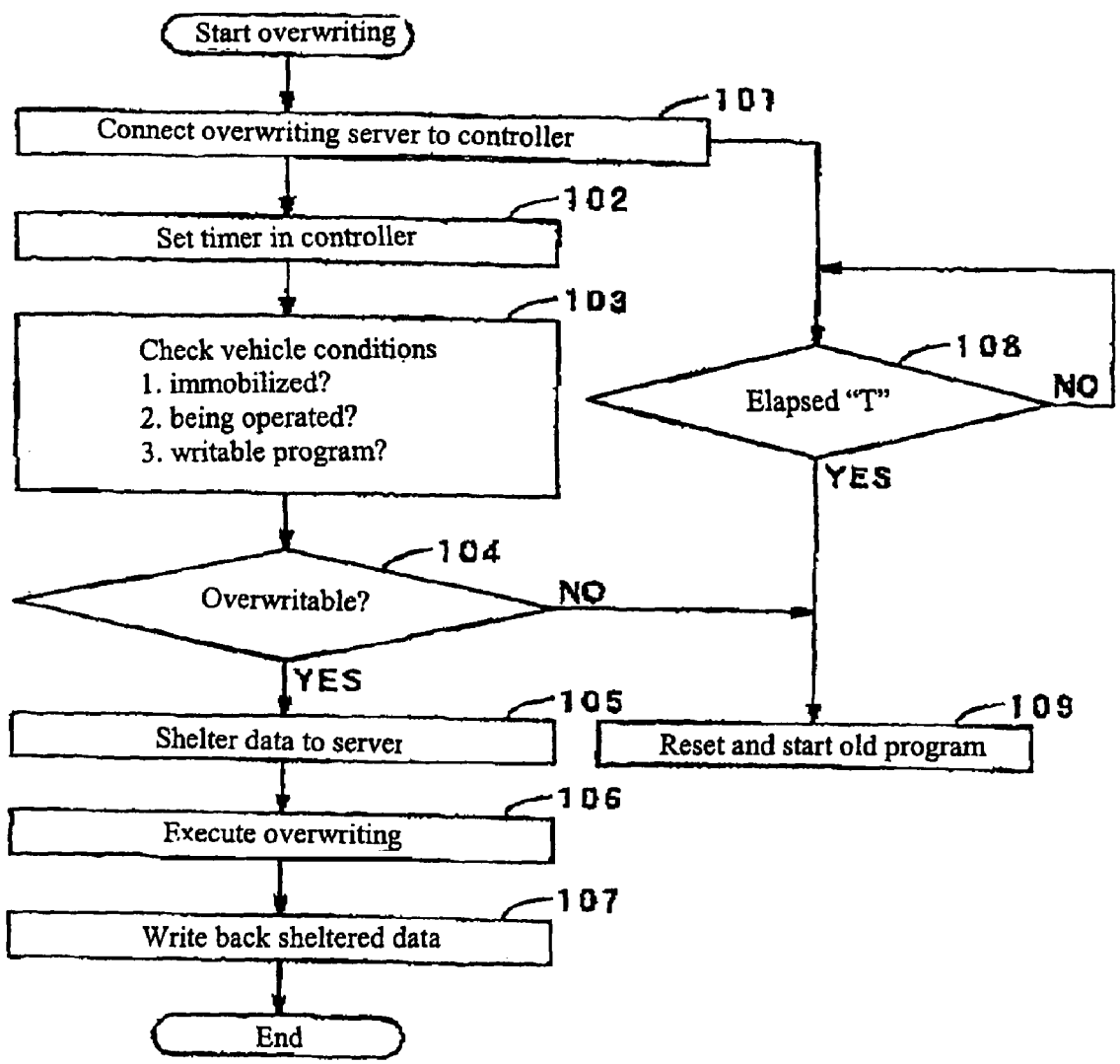

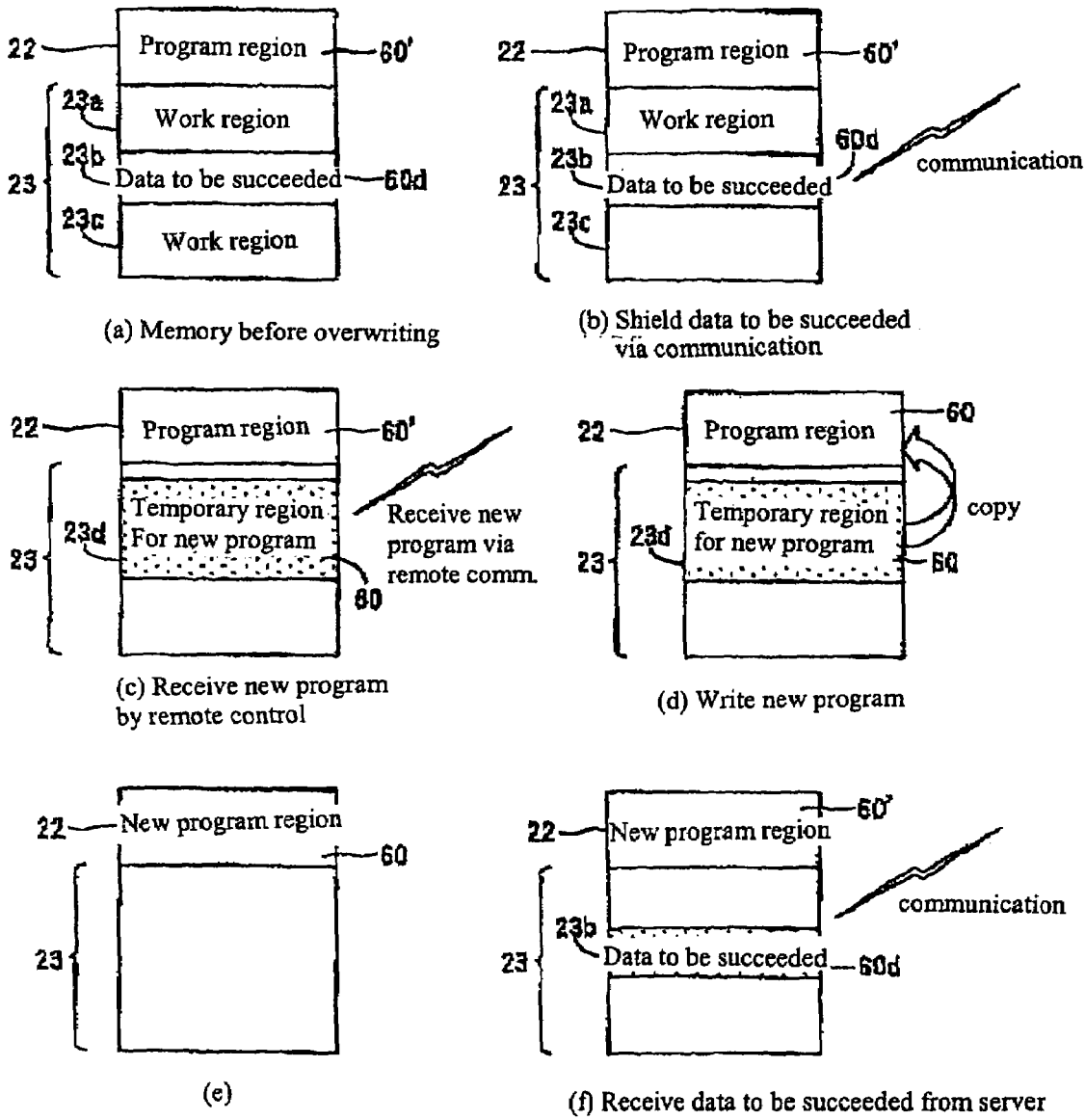
FIGURE 3: History of Flash Memory and RAM Conditions

FIGURE 4: Unwritable Data Region
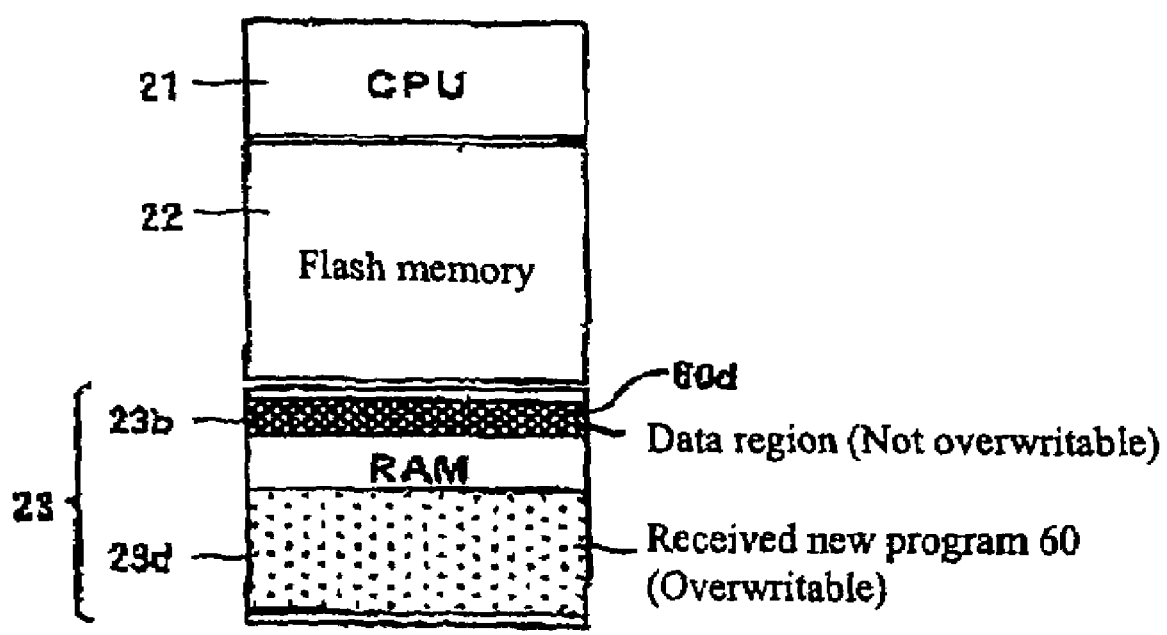

FIGURE 5: History of Flash Memory and RAM during Sheltering (Protecting) Data
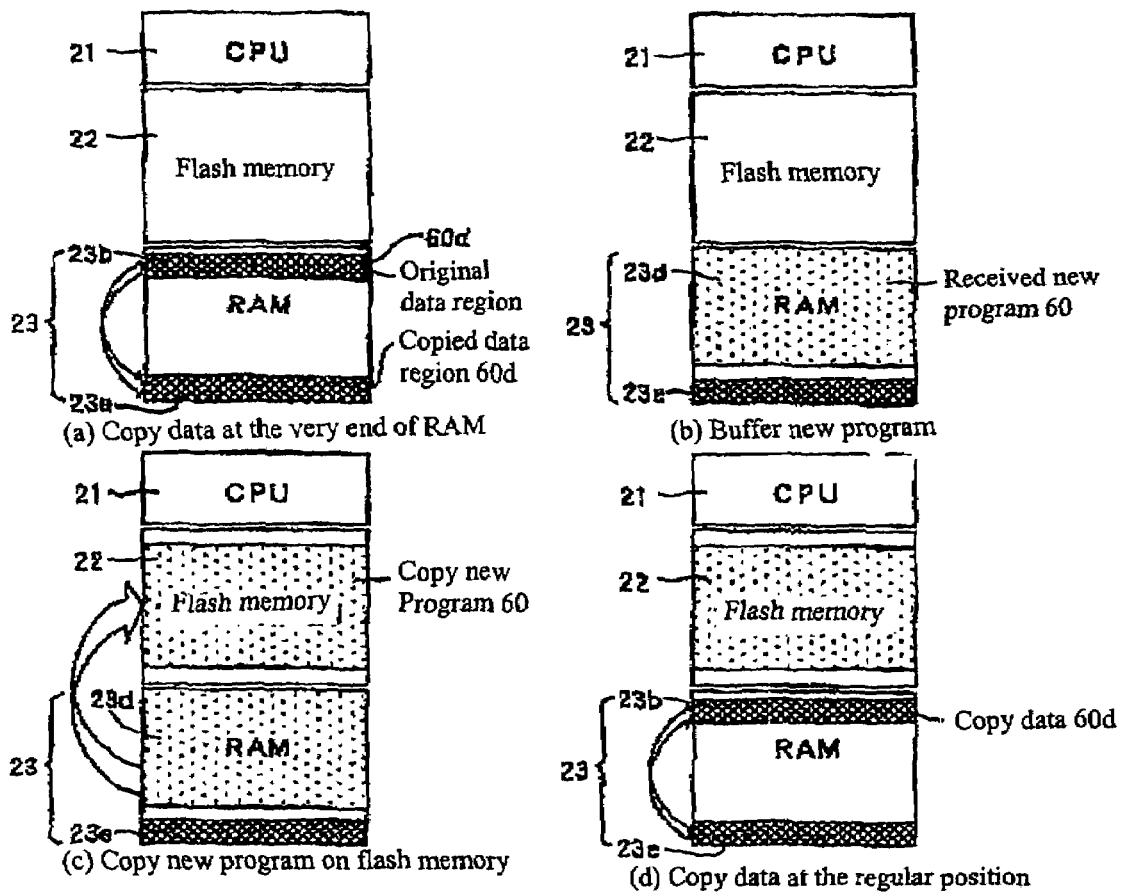

FIGURE 6: Data Sheltering (Protecting) Procedure
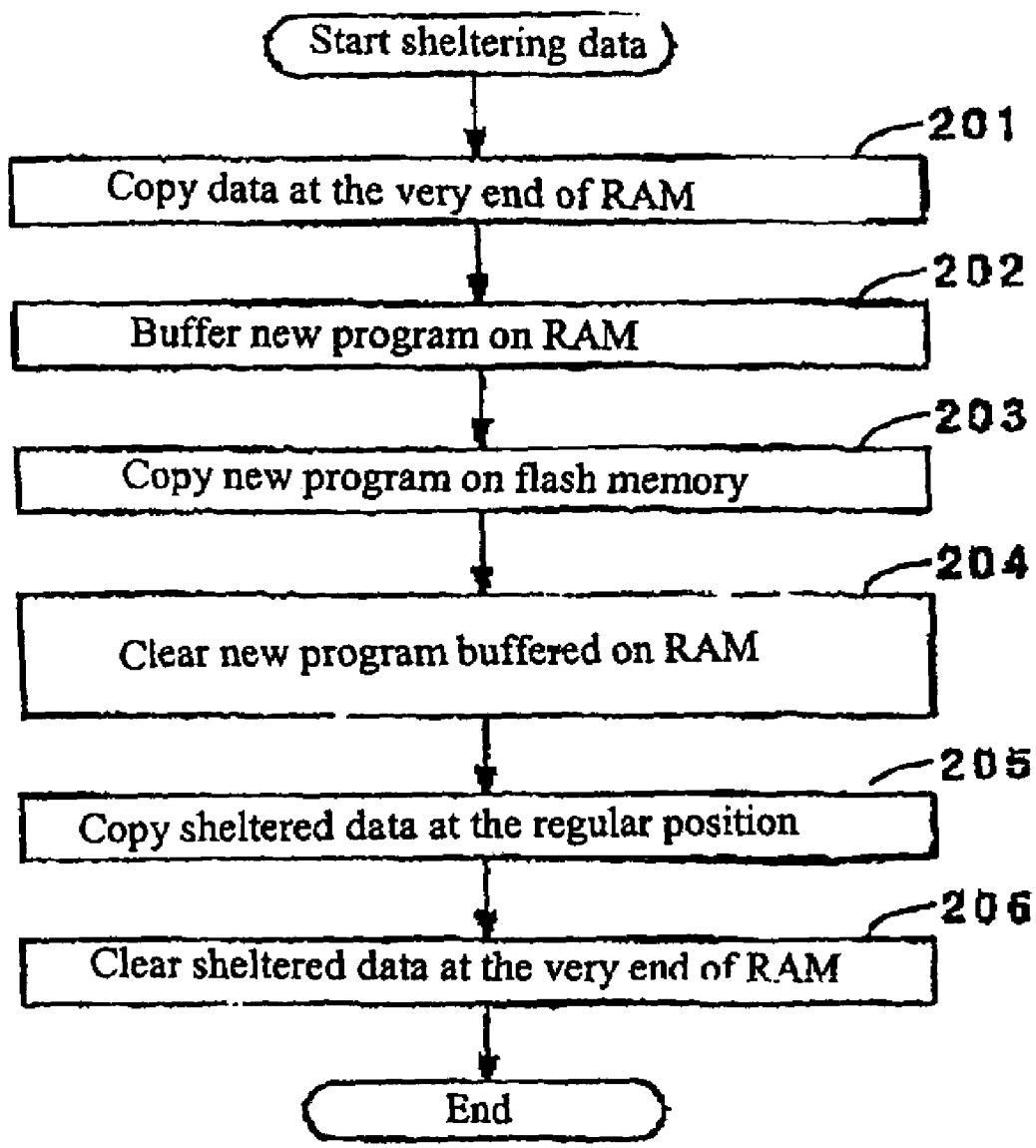

FIGURE 7: Verification Procedure with Reference to Master File
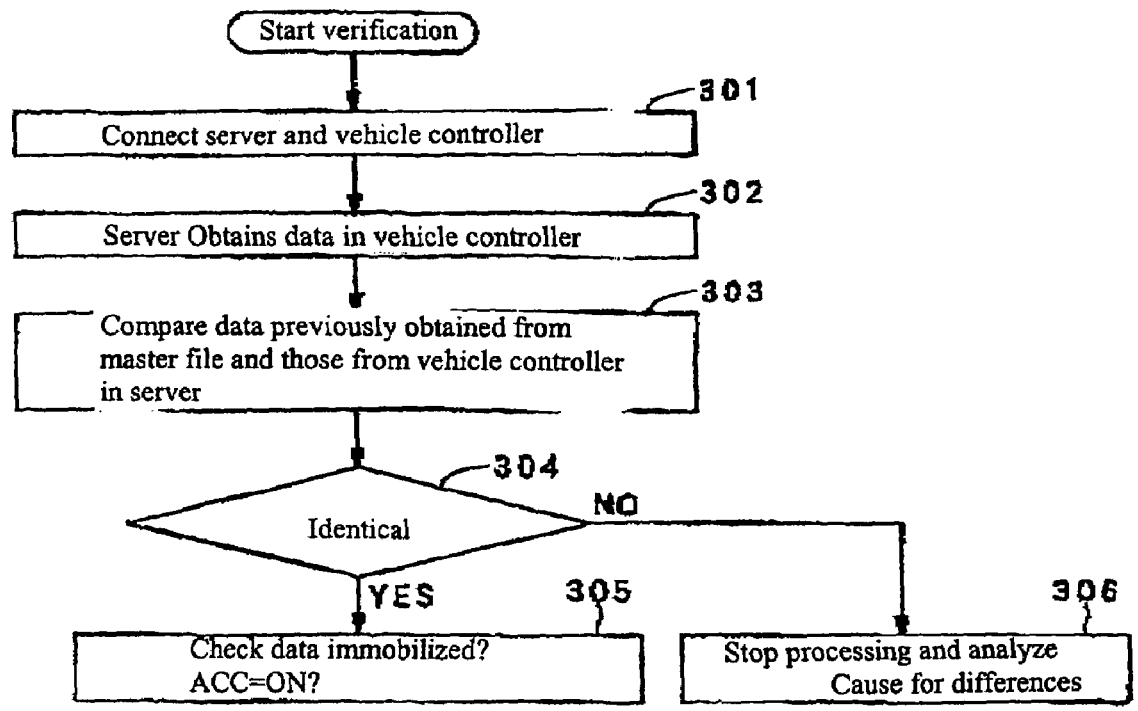

FIGURE 8: Server Switching Procedure
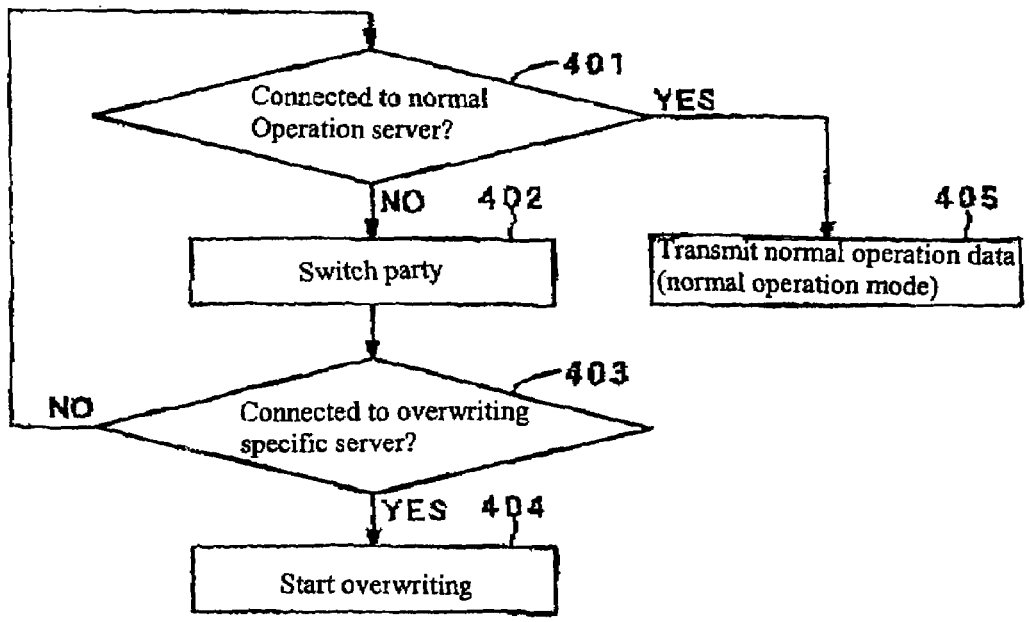
FIGURE 9: Normal Mode – Overwriting Mode Switching Procedure
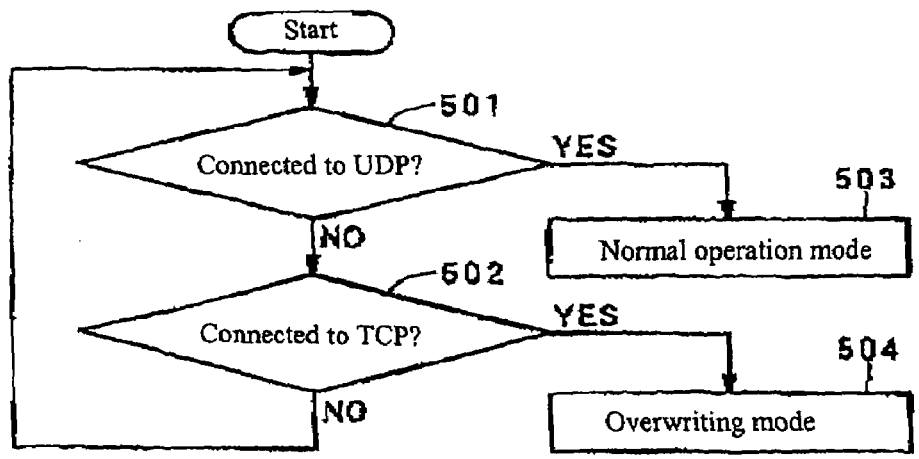

FIGURE 10: Server - Construction Machine Relations
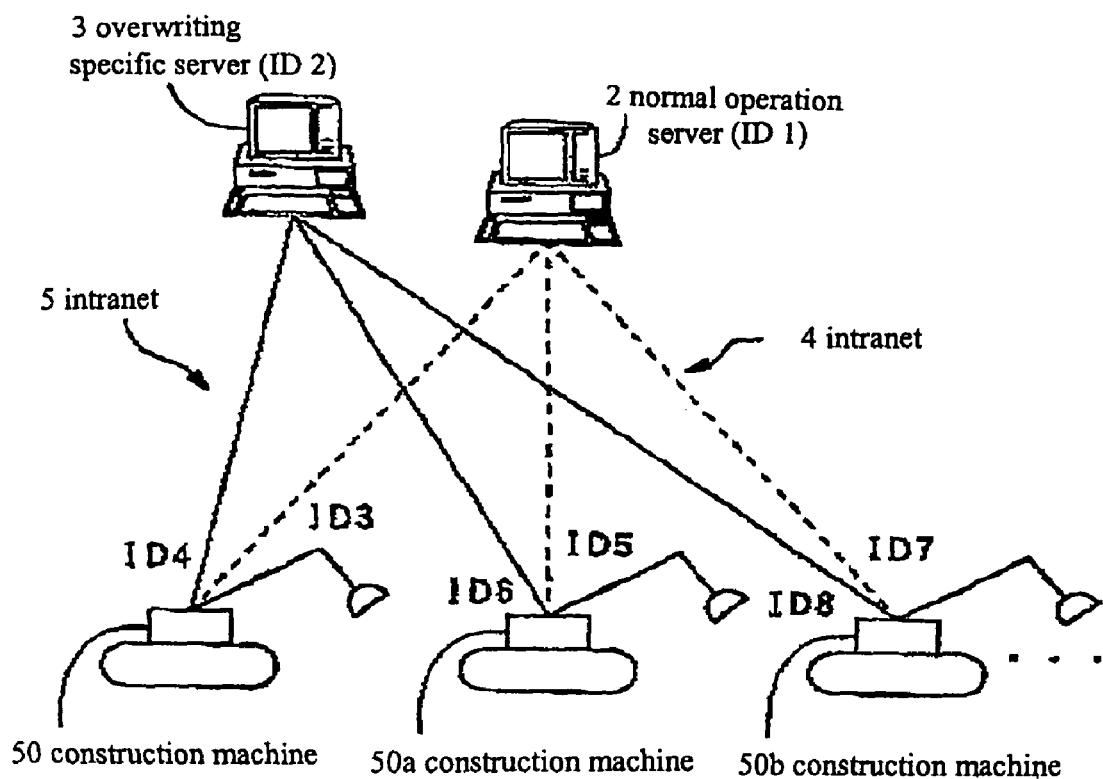

COMMUNICATION SERVER SWITCHING CONTROLLER

TECHNICAL FIELD

The present invention relates to a server switching controller for switching between communication terminals installed in vehicles or machines.

BACKGROUND OF THE INVENTION

Construction machines or vehicles are equipped with a variety of controllers designed to collect vehicle operating data such as the current location of the machine or vehicle, data representing the accumulated operating hours of the vehicle or machine as may be identified on a service-hour meter, data representing the error history of the vehicle, and the like. A controller of this type installed in a vehicle has a CPU that executes computations, collects the vehicle operating data, and communicates with external servers in accordance with a program stored in an EEPROM (electrically erasable programmable ROM) such as flash memory. A controller installed in a vehicle is connected to an external server to freely communicate with each other via communication means (e.g. the internet) to send the collected data associated with each vehicle to one another. An operator may go to a site and connect his or her personal computer to the controller on the vehicle to read out vehicle operating data.

Certain situations require the installed program to be overwritten such as when upgrading the program; creating error codes specific to each vehicle; and changing a threshold value, and the like.

Japanese Patent Publication H10-212739 (hereinafter Patent Publication 1) discloses a communication data collection network for vehicles comprising: a controller for collecting vehicle operating data and a monitoring device, which is located in a remote location as a server to link the data collection network to the monitoring device that the monitoring device may command the operating data collection controller to overwrite the normal operating data processing program with another operating program. In a normal operating mode, a controller installed in a construction machine collects operating data in accordance with a data processing program which processes the data, and sends the data to the monitoring device when the monitoring device requests the data. During an overwriting mode, the monitoring device sends a new operating data processing program to the construction machine to overwrite the current data processing program in the operating data collection controller associated with the construction machine.

There is a demand to permit overwriting a data processing program in one or more construction machines or vehicles which are interconnected through a common communication system in such a manner that a designated construction machine or plurality of machines can perform normal operating data processing under one data processing program while another group of machines are switched into an overwriting mode for operation under a different data processing program.

Data transmitted between a server (hereinafter "monitoring device") and construction machines during normal operating data processing typically includes data representative of the current location of the vehicle, a value representing (e.g. accumulated operating hours) displayed on a service-hour meter, an error history of the vehicle, and the like, in which data volume may only constitute several bytes of information. In contrast, data transmitted between the monitoring device and construction machines for overwriting the current program is exponentially larger than the data volume transmitted for normal operations.

For this reason, an inefficiency arises if the same monitoring device is assigned to handle simultaneous operation for normal operating data processing and for overwriting in that the monitoring device in the overwriting mode will monopolize the communication circuit between the interconnected construction machines. This in turn may increase the time required for overwriting, thereby hindering smooth transmission of the vehicle operating data between servers and other construction vehicles during normal operations. This may further cause the vehicle operating condition data (hereinafter referred to as "vehicle condition data") to be lost in the middle of the communication circuit or received too late. In a worst case scenario, a system crash may occur, adversely affecting normal operations.

The vehicle or machine condition data collected during normal use by construction vehicles or machines contain data that may be crucial to the users of the construction vehicles and machines. An interruption in real time reception of the vehicle or machine operating data by the monitoring device is unacceptable.

Patent Publication 1 does not permit parallel processing of both normal operating data and overwriting data nor does it teach a method of switching between terminals to permit overwriting data in one or more construction machines interconnected to one another through a common communication system.

SUMMARY OF THE INVENTION

In accordance with the present invention, means are provided to stabilize data transmission between servers and multiple vehicles (e.g. construction vehicles or machines) such that the vehicle and servers can perform both overwriting and normal data operations in a parallel manner.

The server switching controller system of the present invention includes a first server (2) and a second server (3) connected to a common controller (30, 20) installed in a vehicle (50) via communication means (14, 15, 8, 9, 10, and 11) to freely communicate with each other with said first server (2) and said second server (3) each having a server ID and an address (ID1 and ID2) for identifying itself; and with the controller (30, 20) having a controller ID and an address ID3 corresponding to the first server ID or an address ID4 corresponding to the second server ID, respectively such that the controller (30, 20) in the vehicle 50 will be connected either to first server (2) or to the second server (3) based on the address of the first server (2) or second server (3) respectively and program means for switching the address setting in the controller to permit the controller to selectively communicate with either the first or second server so as to operate either in a normal mode or in an overwrite mode.

The first server (2) may be a normal operation server (2) which transmits and receives data associated with vehicle operating conditions to and from the data collection controller (20) and the second server (3) may be an overwriting server (3) that sends a new program to be written over the current program in controller (20).

The vehicle 50 can be interchangeably connected to either the first server 2 or the second server 3 eliminating the possibility of overloading a server by sending a large volume of data over a common communication circuit during the overwrite mode. Data transmission between servers and many vehicles is thus stabilized.

Vehicle 50 may represent a construction machine and may be interchangeably connected to different servers, namely, to normal operation server 2 and to the overwriting server 3 by switching. As a result, when many construction machines are involved, a construction machine may perform its normal operation when connected to normal operation server 2 while another construction machine may be switched to the overwriting mode by connection to the overwriting server 3.

BRIEF DESCRIPTION OF THE INVENTION

FIG. 1 is an overall configuration of an embodiment of the system of the present invention.

FIG. 2 is a diagram illustrating the procedure for overwriting [data] in the above embodiment.

FIG. 3(a)-(f) illustrate a history of conditions of flash memory and RAM.

FIG. 4 is a diagram illustrating a data region which cannot be overwritten.

FIG. 5(a)-(d) illustrate a history of conditions of a flash memory and RAM.

FIG. 6 is a diagram illustrating the procedure for protecting or sheltering data.

FIG. 7 is a diagram illustrating the procedure for verification between the master file [and the construction machine or vehicle].

FIG. 8 is a diagram illustrating the procedure for switching servers.

FIG. 9 is a diagram illustrating the procedure for switching between the normal operation mode and the overwriting mode.

FIG. 10 is a diagram illustrating the relationship between servers and construction machines.

DETAILED DESCRIPTION OF THE INVENTION

In the system of the embodiment as shown in FIG. 1, construction machine 50 is connected to a normal operation server 2 and to an overwriting specific server 3 via communication means (radio 11, antenna 10, dedicated line 9, ground wave base station 8 and dedicated lines 14, 15) so as to communicate with each other. The "current" program for normal operation is hereinafter referred to as the "vehicle program 60'" which may be overwritten as a "new" vehicle program 60 on a remote basis from server 3 by an overwriting control program 61.

Normal operation server 2 is hooked up to the intranet 4, from where it is further connected to the internet 7. Normal operation server 2, thus, acts as a server for terminals of clients of internet 7 and intranet 4. This normal operation server 2 is given an IP address "ID 1" (server ID), by which server 2 is identified in the network. Construction machine 50 is equipped with a communication terminal (hereinafter referred to as "communication controller 30") described later which can communicate with normal operation server 2. Communication controller 30 is given an IP address "ID 3," for normal operation when in communication with server 2 at ID1.

An overwriting specific server 3, is also connected to intranet 5 and to the internet 7 and thus, acts as a server for terminals of clients of internet 7 and intranet 5. The overwriting specific server 3 is given an IP address "ID 2" (overwrite server ID), by which it is identified in the network. The "communication controller 30" can also communicate with the overwriting specific server 3. Communication controller 30 is given an IP address "ID 4," when communicating with server 3 in the overwrite mode.

The relationship between other construction machines and servers are the same as described above.

The relationship between multiple machines 50, 50a, 50b . . . the normal operation server 2, and overwriting specific server 3 is shown in FIG. 10.

An IP address "ID 5" is given to communication terminals (communication controller) in construction machine 50a such that it corresponds to "ID 1," the server ID of normal operation server 2; another IP address "ID 6" is also given to construction machine 50a such that it corresponds to "ID 2," the server ID of overwriting specific server 3.

In the same manner, an IP address "ID 7" is given to a communication terminal installed on construction machine 50b such that it corresponds to "ID 1," the server ID of normal operation server 2; another IP address "ID 8" is also given to construction machine 50b such that it corresponds to "ID 2," the server ID of overwriting specific server 3.

Servers designated as ID 1, ID 3, ID 5, ID 7, . . . and communication terminals constitute a single intranet 4.

In the same manner, servers designated as ID 2, ID 4, ID 6, ID 8, . . . and communication terminals constitute another single intranet 5 network.

A vehicle or construction machine 50 as shown in FIG. 1 is equipped with communication controller 30 having a radio terminal that communicates utilizing standard packet data communication protocol. Antenna 31 for communication controller 30 communicates with ground wave antenna 10 which communicates via radio communication 11 utilizing the packet communication protocol. Antenna 10 is connected to ground wave base station 8 via dedicated line 9. Ground wave base station 10 is connected to intranet 4, 5 via dedicated lines 14 and 15.

Besides communication controller 30, vehicle or construction machine 50 is equipped with other controllers such as data collection controller 20, engine controller 40 and the like. These controllers are connected to each other via communication circuit 51 installed in the vehicle body and communicates in accordance with a given communication protocol.

Cooling water for engine 57, voltage from battery 53, and GPS sensors are provided to different parts of the body of construction machine 50 and each sensor constitutes a sensor group 52. Note that GPS sensors receive electric waves transmitted from the GPS satellite to detect the absolute position geographical coordinates for a specific construction machine 50. The construction machine 50 also includes a electronic calendar and timer. The calendar and timer identify the date, month, year, and time (hours, minutes, and seconds). A service-hour meter (hereinafter referred to as "SMR") that calculates accumulated operating hours of engine 57 is also included in the machine 50.

The data collection controller 20, CPU 21 and flash memory 22 for the machine 50 are connected to each other via bus 24 to provide for mutual accessibility of input and output data thereof. Flash memory 22 is a type of EEPROM (electrically erasable programmable ROM). An EEPROM of the flash memory type may be used in place of RAM 23. A suitable vehicle program 60' is stored in a given region of flash memory 22. A given memory region on flash memory 22 has an overwriting control program 60 for overwriting program 60' in the vehicle as described later.

CPU 21 performs calculations in accordance with vehicle program 60 to compile vehicle condition data, which is then stored in a data region in RAM 23.

If an immobilizer is set to be "valid", CPU 21 counts the values of the calendar and the timer and outputs the "immobilize" command when the time comes, thereby immobilizing the construction machine 50. The CPU 21 outputs a "release immobilization" command when the time set for immobilization elapses.

The following vehicle condition data are stored in the data region of RAM 23.

IP address of the vehicle (ID 3, ID 4).

Vehicle program 60' in the vehicle of the present version.

Confirmation data verifying the completion of inspection of a communication terminal (communication controller 30) at the point of opening a radio station [sic, installation].

Type, model, product number of construction machine 50.

Values indicated on SMR (accumulated operating hours).

Present voltage at the terminal of battery 53 (battery terminal voltage data).

Cooling water temperature.

Current absolute position [sic, coordinates] (absolute position data) of the vehicle detected by a GPS sensor.

An error code history of the vehicle.

Key switch data indicating whether key switch 54 is turned on (at the ACC position) at present.

Immobilization data indicating whether the machine is immobilized or not at present or the time frame during which the immobilization is in effect.

Bus 24 is connected to an SMR, sensor group 52 outside data collection controller 20 via an interface; it is also connected to communication circuit 51 within the vehicle but external to controller 20.

Note that in this embodiment, communication controller 30 and data collection controller 20 are separate terminals, and IP address "ID 3" and "ID 4" of communication controller 30 are set in data collection controller 20. It should be apparent that the communication controller 30 and the data collection controller 20 may be integrated into a single controller or communication terminal for the vehicle 50.

Immobilizing circuit 55 is built into the vehicle or machine 50.

Immobilizing circuit 55 is constructed with relays and the like which may be interposed between a key switch 54 and starter 56 of engine 57. The power source of starter 56 is battery 53, which is also a power source for each controller 20, 30, and 40.

When a "set" or "select" immobilization command is outputted from the engine controller 40, a relay in the immobilizing circuit 55 operates to lock or immobilize the starter 56. As a result, even though the key switch 54 is turned on, the terminal voltage of the battery 53 is not applied to starter 56. Starter 56 is thus immobilized, thereby disabling engine 57 from starting. In contrast, as the immobilization is released upon receipt of a "release" command output from engine controller 40, immobilizing circuit 55 and its relay are released. In other words, if an operator turns key switch 54 on, starter 56 starts engine 57. Either the above "set" or "select" immobilization" command or the "release" command is output by data collection controller 20 to engine controller 40 in accordance with the vehicle program 60 via the communication circuit 51. "Set immobilization" command or "release" command is output by data collection controller 20 when immobilization is set to be "effective" at the moment. Data with respect to whether the time entered is during the immobilization period or not is determined by data collection controller 20 based on the values showing in the calendar and the timer in data collection controller 20.

The data with respect to whether key switch 54 is turned on is output by engine controller 40 and taken by data collection controller 20 via communication circuit 51 in the vehicle body.

Server Switching Control

Normal operation server 2 controls vehicle operating data from multiple construction machines including construction machine 50.

Overwriting specific server 3 is a server that remotely controls overwriting of the vehicle program 60' in the vehicle.

Normal operation server 2 has a master file 6 and the latest vehicle condition data taken by normal operation server 2 is stored in master file 6.

On the other hand, overwriting specific server 3 has a master file 6'. The data stored in master file 6 from the server 2 is used by the overwriting specific server 3 via internet 7 to produce the master file 6', which is then a "replica" of master file 6 in that it has the same contents stored in master file 6.

Next, the construction machine 50 establishes the connection with the individual servers based on the server switching procedure hereinafter explained with reference to FIG. 8.

Initially, controller 20 in the vehicle or machine 50 has "ID 3" set to be "valid" when "ID 3" which is one of the IP addresses corresponds to "ID 1" of normal operation server 2. During this period, "ID 4" is set to be "invalid". "ID 4 is the other IP address which corresponds to "ID 2" of overwriting specific server 3. The "valid" IP address "ID 3" set in controller 20 is, then, taken from data collection controller 20 to communication controller 30 via communication circuit 51.

When a command for sending vehicle condition data of the construction machine 50 is sent from normal operation server 2 to construction machine 50 via dedicated line 14, by ground wave base station 8, dedicated line 9, and antenna 10 by radio communication 11, the data is then received by antenna 31 of construction machine 50, which is then taken into communication controller 30. The vehicle condition data originating from normal operation server 2 contains "ID 1" for its server ID. Currently, "ID 3" is set as the IP address for communication controller 30 and the received vehicle condition data contains "ID 1" for its server ID, which causes communication controller 30 to determine that both the normal operation server 2 and the construction machine 50 are in the same network ("ID 1" corresponds to "ID 3"), thereby establishing connection therebetween. The vehicle condition data is thus made ready for transmission by the construction machine 50 corresponding to the YES pathway for Step 401 in FIG. 8.

The command by communication controller 30 for sending the vehicle condition data is thus taken by data collection controller 20 via communication circuit 51 in the vehicle body. When a command for sending an SMR value reaches data collection controller 20, the present SMR value stored in the data region on RAM 23 in controller 20 is taken by communication controller 30 via communication circuit 51 in the vehicle body. The SMR value is sent through antenna 31 of communication controller 30 via radio communication 11, and further transmitted to normal operation server 2 via antenna 10, dedicated line 9, ground wave base station 8 and dedicated line 14.

When normal operation server 2 sends the "set immobilizer data" (e.g. valid, invalid, time) command to construction machine 50, the required data is set for data collection controller 20 in the same manner as described above.

Alternately, each terminal, which is a client of normal operation server 2, may send a similar command to construction machine 50 via normal operation server 2.

When a specific event occurs in construction machine 50, such an event representing a specific abnormality or a specific condition such as time, the classification of abnormality or specific condition will be regularly transmitted as vehicle condition data to controller 30 via communication circuit 51, and then, transmitted through antenna 31 of communication controller 30 by radio communication 11 (automatic transmission). The vehicle condition data is automatically transmitted and taken by normal operation server 2 via antenna 10, dedicated line 9, ground wave base station 8 and dedicated line 14.

The vehicle condition data of construction machine 50 taken by normal operation server 2 can be displayed on each client's monitor by the client's accessing normal operation server 2, which is further connected to networks, specifically, internet 7 and intranet 4.

The latest vehicle condition data taken into normal operation server 2 is stored in master file 6 and also stored in master file 6' via internet 7 (Step 405 in FIG. 8).

When one wants to upgrade vehicle program 60' or produce error codes for each construction machine 50 or change a threshold value or the like for each construction machine 50, a new vehicle program 60 is written over old vehicle program 60' stored in flash memory 22. A prime is used to differentiate the old program 60' as currently stored from rewritten or "new" vehicle program 60.

When a command for sending vehicle condition data of construction machine 50 is generated from normal operation server 3 via dedicated line 15, ground wave base station 8, dedicated line 9, and antenna 10 by radio communication 11; the data is sent through antenna 31 of construction machine 50 to be received by communication controller 30.

The vehicle condition data transmitted by normal operation server 2 contains an IP address of "ID 1" for its server. However, the IP address for communication controller 30 is ID3 when in normal communication with server 2 and if the received vehicle condition data contains "ID 2" for its server ID, the communication controller 30 recognizes that "ID 2" does not correspond to the address of the normal operation server 2 but instead corresponds to the server ID of the overwriting server 3. Stated otherwise, the communication controller 30 recognizes a mismatch exists in that the server connection is incorrect. A mismatch is reflected in the flow diagram of FIG. 8 by the step designation "NO" at step 401. The result is a communication disconnect between the server 2 and the communication controller 30. It should further be noted that "ID2" and "ID3" do not belong to the same intranet network.

The data representing termination of communication due to ID mismatch is taken into data collection controller 20 via communication circuit 51 in the vehicle body. Upon receipt of this data, the data collection controller 20, whose IP address "ID 4" corresponds to the overwriting specific server 3, is switched to "valid," and "ID 3", the IP address corresponding to "ID 1" of normal operation server 2 is switched into the overwriting mode. "ID 4," which is set to the "valid" IP address in data collection controller 20, is taken from data collection controller 20 into communication controller 30 via communication circuit 51 as indicated by the "switch party" step 402 in FIG. 8.

Overwriting specific server 3 upon notification of disconnection of communication, resends an overwriting command to construction machine 50. The data now sent by overwriting specific server 3 includes "ID 2" for its server ID and "ID 4" is set for communication controller 30 as its IP address. The received vehicle condition data contains "ID 2" as server identification for server 3. Communications controller 30 now recognizes that "ID 2" corresponds to the address "ID 4", thereby establishing connection therebetween as indicated by the YES pathway of Step 403 in FIG. 8.

Thereafter, an overwriting command from the overwriting server 3 causes the vehicle program 60' in the flash memory 22 based on additional conditions occurring, as will be explained hereinafter, to be overwritten by data collection controller 20 as indicated by the "start overwriting" step 404 in FIG. 8.

According to the above embodiment, construction machine 50 can switch its normal operation server 2 to overwriting specific server 3. Although many construction machines 50, 50a, 50b, . . . many communicate in common through the network with each construction machine performing its normal operation through the normal operation server 2 one or more construction machines may be placed in the overwriting mode and connected to overwriting specific server 3. This eliminates the possibility of overloading a server or having a large volume of data monopolize the circuit. The data transmission between servers and many vehicles is thus stabilized.

The procedure for overwriting vehicle program 60' in accordance with a command received from overwriting specific server 3 is illustrated in FIG. 2.

Restoration of Normal Operating Mode

As illustrated in FIG. 2, as soon as construction machine 50 and overwriting specific server 3 are connected in Step 403 in FIG. 8, a timer is set in data collection controller 20 and the "timer task" is executed (Steps 102, 108, and 109).

The time is set to a time duration of "T", the estimated time required for overwriting plus some allowance.

Data collection controller 20 operates on a multitask basis and the timer task operates independently from another task or overwriting task (Steps 103-107). Therefore, even if the overwriting task goes out of control, the timer task is accurately carried out to restart old vehicle program 60' utilizing an automatic resetting function.

When the overwriting task (Steps 103-107) is normally completed, the timer is cleared before time "T" elapses and a new vehicle program 60 is written over the old program 60'.

However, if communication is interrupted in the middle of the overwriting task or the other party hangs up, overwriting cannot be completed even though time passes the set "T" value (YES for Step 108), and the program is reset to start old vehicle program 60'.

Moreover, the communication mode of construction machine 50 and servers are switched back from the overwriting to the normal operating mode. In other words, in data collection controller 20, whose IP address "ID 4" corresponds to "ID 2" of overwriting specific server 3, recovers its original "invalid" state while "ID 3", whose IP address corresponds to "ID 1 of normal operating server 2, recovers its original "valid" state (normal operating mode). "ID 3," now being a "valid" IP address for data collection controller 20, is taken from data collection controller 20 into communication controller 30 via communication circuit 51 in the vehicle body. Normal operation server 2 is thus reconnected to process normal operating data (Step 109).

As described above, even though a communication is interrupted or the other party hangs up during overwriting data processing, the old vehicle program 60' starts to maintain functionality of data collection controller 20 in this embodiment. Normal processing is thus ensured and data collection controller 20 is prevented from down time to maintain high productivity. In addition, as the set time "T" elapses, the overwriting mode is automatically switched from the overwriting mode to the normal operating mode, preventing the overwriting process from monopolizing the communication circuit. Room for processing normal operating data is thus created, thereby enhancing capacity for normal processing.

Checking Vehicle Condition Data

When a communication link is established between overwriting specific server 3 and communication controller 30 of construction machine 50 in Step 101 in FIG. 2, server 3 sends the "overwrite" command from overwriting specific server 3 to communication controller 30, which is then received by data collection controller 20 via communication circuit 51.

As data collection controller 20 receives the "overwrite" command, first, the check present vehicle condition data" is executed in Step 103, to determine whether vehicle program 60 should be overwritten based upon the result of the check in Step 104 of the conditions in Step 103.

Overwriting specific server 3 executes the checking and the decision making processes of Steps 103 and 104. In other words, the "overwrite" command reaches data collection controller 20, when the vehicle condition data to be checked stored therein is sent out therefrom to communication controller 30 via communication circuit 51 in the vehicle body. The vehicle condition data to be checked is then transmitted by radio communication 11 from antenna 31 of communication controller 30 to overwriting specific server 3 via antenna 10, dedicated line 9, ground wave base station 8 and another dedicated line 15.

Overwriting specific server 3 checks the received vehicle condition data and decides that the overwriting process should be executed if all of the following conditions are met:

1) Starter 56 is not being immobilized.
2) Construction machine 50 is not being operated.
3) Old vehicle program 60' is currently in use, i.e., it is the current writable program.

"Starter 56 is not being immobilized" (see above 1)) is considered to be one of the conditions that must be met before executing overwriting because there is a possibility that data collection controller 20 may stop functioning in the middle of overwriting. This may consequently cause data collection controller 20 to output "release immobilization" command. Usually, construction machine 50 is operated under severe conditions: for example, it may be surrounded by cliffs or collapsing objects. If the immobilizer is released under these circumstances, the operator will be exposed to danger.

Whether "starter 56 is not being immobilized" (see above 2)) is determined based on the immobilizer data stored in data collection controller 20: assume a case in which "invalid" is set for the immobilizer, "valid" may be set for immobilizer for the period of time that the immobilizer is released, corresponding to when starter 56 is not being immobilized.

"Construction machine 50 is not being operated" (see above 2)) is also one of the conditions that must be met before executing overwriting because if new vehicle program 60 is transmitted when construction machine 50 is somehow still being operated (e.g. driven), communication may be interrupted or become unstable and overwriting cannot be completed normally.

Whether "construction machine 50 is not being operated" is determined based on key switch data stored in data collection controller 20: whenever key switch 54 is turned off (at the ACC position), "construction machine 50 is considered not being operated". Alternately, whether construction machine 50 is being operated or not may be determined by detecting the terminal voltage of an alternator or the rpm of engine 57.

"Old vehicle program 60' currently in use" (see above 3)) is also one of the conditions that must be met before execution of overwriting because if the program cannot be overwritten, no overwriting should occur. As described above, the version of vehicle program 60' currently in use is stored in data collection controller 20 as part of the vehicle condition data.

The following additional conditions may be included on an "as required" basis:

4) Communication terminal (communication controller 30) inspection for installation is completed.
5) Battery terminal voltage is within a normal range.
6) Construction machine 50 is located in a place where stable radio communication 11 is available or it is in a safe place.

"Communication terminal (communication controller 30) inspection for installation is completed (see above 4) may be included at one of the conditions that must be met before executing overwriting because the server will not otherwise be ready to control construction machine 50.

"Battery terminal voltage is within a normal range" (see above 5) may also be included as one of the conditions that must be met before executing overwriting because if the terminal voltage of battery 53 is out of a normal range, CPU 21 of data collection controller 20 will not operate in a stable condition and as a result, overwriting may result in abnormal completion. Whether the battery terminal voltage is within a normal range can be determined based on the battery terminal voltage data stored in data collection controller 20.

"Construction machine 50 is located in a place where stable radio communication 11 is available or it is in a safe place" (see above 6) may also be included as one of the conditions that must be met before executing overwriting because there is a possibility that communication may be interrupted or become unstable during the transmission of new vehicle program 60 to construction machine 50. If this happens, overwriting may result in abnormal completion. Data collection controller 20 can determine whether construction machine 50 is located in a place where stable radio communication 11 is available or it is in a safe place based on the absolute position data (sic, position coordinates) stored therein.

It is not mandatory to meet all of the above conditions 1-6. Any combination of conditions may be used as necessary conditions before the overwriting mode will be enabled.

Overwriting specific server 3 determines whether overwriting should be executed based on vehicle condition data stored in data collection controller 20. Alternately, master file 6' having the latest version of vehicle condition data of construction machine 50 stored therein may be referenced to determine whether overwriting should be executed. Both the vehicle condition data stored in data collection controller 20 and those stored in master file 6' may be referenced to determine whether overwriting should be executed.

FIG. 7 illustrates the procedure required for verification when a decision is made with reference to vehicle condition data stored in data collection controller 20 and those stored in master file 6'.

More specifically, as overwriting specific server 3 establishes its connection to communication controller 30 of construction machine 50 (Step 301), construction machine 50 sends vehicle condition data of data stored in collection controller 20 to overwrite specific server 3, where the data is retained (Step 302). On the other hand, overwriting specific server 3 has the same vehicle condition data to be checked with master file 6'. Then, the vehicle condition data previously retained with reference to master file 6' and those obtained through data collection controller 20 are compared (in Step 303) to determine whether the data is identical. Regarding immobilizer data, for example, whether data in master file 6' is identical to that in data collection controller 20 is determined (Step 304).

When the data in the two different sources above are identical designated as "YES" in Step 304, the checking process in Step 103 in FIG. 2 is executed and whether overwriting should be executed is determined in Step 104 of FIG. 2 (Step 305). If the data from the two different sources are not identically designated as "NO" in Step 304, the checking process and decision making step with respect to execution of overwriting is interrupted and the cause for having different data sets is analyzed (Step 306).

If overwriting specific server 3 determines that overwriting should be executed (YES for Step 104 in FIG. 2), overwriting specific server 3 sends the decision to construction machine 50, where data collection controller 20 writes new vehicle program 60 over old vehicle program 60' (Steps 105, 106, and 107). If overwriting specific server 3 decides that overwriting should not be executed (NO in Step 104 in FIG. 2), overwriting specific server 3 sends the decision to construction machine 50, where the decision data is taken into collection controller 20. Data collection controller 20 executes resetting in the same manner as when time "T" elapses from the setting time and starts old vehicle program 60'. In addition, the communication mode between construction machine 50 and server 3 is switched from overwriting to normal operation so that the normal operation server 2 can communicate with construction machine 50, thereby carrying out normal operation processing (Step 109).

According to the above embodiment, the vehicle condition data is checked before overwriting the data, thereby providing a countermeasure to avoid abnormal termination of overwriting or to avoid disasters. Particularly, this embodiment prevents data collection controller 20 from malfunctioning due to immobilization as a result of a malfunction of starter 56.

Overwriting Process Control

Overwriting processes in Steps 105, 106, and 107 of FIG. 2 are described herein with reference to FIGS. 2 and 3. FIG. 3(a)-(f) illustrate conditions of flash memory 22 and RAM 23.

FIG. 3(a) illustrates conditions of flash memory 22 and RAM 23 before overwriting. As illustrated in FIG. 3(a), vehicle program 60' is stored in the program region of flash memory 22. An overwriting control program 61 is stored in the memory region (not illustrated) of flash memory 22.

Overwriting control program 61 is a program that writes new vehicle program 60 over old vehicle program 60'.

RAM 23 is constructed with work regions 23a, 23c and data region 23b having vehicle condition data 60d stored therein. Work regions 23a and 23c are free hard disk spaces.

If overwriting specific server 3 decides to execute overwriting (YES for Step 104 in FIG. 2), it transmits the decision data to construction machine 50 by radio communication 11 via dedicated line 15, ground wave base station 8, dedicated line 9, antenna 10 to be received by antenna 31 of construction machine 50 and further transmitted from communication controller 30 to data collection controller 20. Then, CPU 21 of data collection controller 20 reads out vehicle condition data 60d in data region 23b on RAM 23 as illustrated in FIG. 3(b) to transmit the data to communication controller 30 via communication line in vehicle body 51. Vehicle condition data 60d are thus transmitted from antenna 31 of communication controller 30 by radio communication 11 and received by overwriting specific server 3 via antenna 10, dedicated line 9, ground wave base station 8 and dedicated line 15.

Overwriting specific server 3 saves vehicle condition data 60d in a given data storage media in server 3 to protect data therein (Step 105 of FIG. 2).

When vehicle condition data 60d is protected in overwriting specific server 3, new vehicle program 60 is transmitted from overwriting specific server 3 to construction machine 50 by radio communication 11 via dedicated line 15, ground wave base station 8, dedicated line 9 and antenna 10. The data is then received by antenna 31 of construction machine 50 and also by data collection controller 20 via communication circuit 51. New vehicle program 60 is thus transferred from communication controller 30 to data collection controller 20. Then, CPU 21 of data collection controller 20 reads out vehicle condition data 60d of RAM 23 as illustrated in FIG. 3(c) to temporarily buffer new vehicle condition data 60d received in temporary region 23d of RAM 23. Temporary region 23d includes not only work regions 23a and 23c but also data region 23b: the capacity of new vehicle program 60 equals the total regions of RAM 23. Nonetheless, data region 23b is made available as a buffer zone for new vehicle program 60 by protecting (sheltering) vehicle condition data 60d in a separate storage space. Buffering of new vehicle program 60, which is a large file stored in RAM 23 is thus ensured.

Overwriting control program 61 stored in flash memory 22 is copied onto a given memory region of RAM 23. Autonomy is thus transferred to copied overwriting control program 61 in RAM 23, and flash memory 22 enters the overwriting mode. Hereinafter, as illustrated in FIG. 3(d), new vehicle program 60 on RAM 23 is written over old vehicle program 60' in flash memory 22 in accordance with overwriting control program 61 in flash memory 22. The new vehicle program 60, which is buffered in temporary region 23d of RAM 23 and CRC is checked and is copied in the program region of flash memory 22, which is the region where old vehicle program 60' is stored. New vehicle program 60 is thus written over old vehicle program 60' (Step 106 in FIG. 2).

As illustrated in FIG. 3(e), as new vehicle program 60 is copied onto flash memory 22, the data so informing is transmitted from data collection controller 20 to communication controller 30 via communication circuit 51 in the vehicle body. The data is further transmitted from antenna 31 by radio communication 11 to overwriting specific server 3 via antenna 10, dedicated line 9, ground wave base station 8 and dedicated line 15.

Overwriting specific server 3, having received the data, transmits vehicle condition data 60d for protection to a separate data storage media to construction machine 50 by radio communication 11 via dedicated line 15, ground wave base station 8, dedicated line 9 and antenna 10. Vehicle condition data 60d is received by antenna 31 of construction machine 5 and is sent from communication controller 30 to data collection controller 20 via communication circuit 51 installed in the vehicle body. Then, CPU 21 of data collection controller 21 writes the received vehicle condition data 60d into the original data region 23b of RAM 23 as illustrated in FIG. 3(f).

When overwriting finishes, CPU 21 resets itself. Autonomy is thus transferred to flash memory 22 which then enters the normal operating mode followed by starting new vehicle program 60 stored in the program region of flash memory 22.

Occasionally, the address of vehicle condition data 60d may be changed when new vehicle program 60 is written over old vehicle program 60'. To solve this problem, when vehicle condition data 60d is protected in overwriting specific server 3 one may change the address of vehicle condition data 60d or make a similar change by overwriting vehicle condition data 60d to match the address of vehicle condition data 60d with that of new vehicle program 60. Vehicle condition data 60d may then be written over original data region 23b of RAM 23.

As described above in accordance with this embodiment, the data that should be saved should never be reset during overwriting (e.g. SMR value for accumulated operating hours and error history of the vehicle), is sheltered from data region 23b of RAM 23 in a data storage medium of overwriting specific server 3 to write the data back in original data region 23b after the overwriting process is completed. Saving of vehicle condition data 60d in a memory space of data collection controller 20 is thus ensured. In addition, data region 23b provides a buffer region for new vehicle program 60 after vehicle condition data 60d is protected therefrom. Therefore, even though controller 20 has a small memory capacity, large vehicle program 60 is buffered. The overwriting processing is thus ensured.

Vehicle condition data 60d is protected in a data storage medium of overwriting specific server 3, which is external to construction machine 50. However, the invention is not limited to the above embodiment. Vehicle condition data 60d may be sheltered internal to construction machine 50 as long as vehicle condition data 60d is protected to a separate memory region or separate data storage media during overwriting.

FIG. 5 illustrates a history of memory conditions in the case where vehicle condition data 60d is protected in a separate memory region in the same RAM 23. The following description is with reference to the flow charts illustrated in FIGS. 5 and 6.

As illustrated in FIG. 5(a), vehicle condition data 60d stored in data region 23b of RAM 23 is copied onto memory region 23e at the very end of RAM 23 where it is protected (Step 201 in FIG. 6). Then, as illustrated in FIG. 5(b), new vehicle program 60 received from overwriting specific server 3 is temporarily buffered in temporary region 23d including data region 23b (Step 202 of FIG. 6).

Then, as illustrated in FIG. 5(c), new vehicle program 60 being buffered in temporary region 23d of RAM 23 is copied in the program region of flash memory 22 (Step 203 in FIG. 6). After this overwriting is completed, new vehicle program 60 remaining in temporary region 23d of RAM 23 is cleared (Step 204).

Next, as illustrated in FIG. 5(d), vehicle condition data 60d, protected in memory region 23e at the very end of RAM 23, is written back to data region 23b, which is the original position thereof in RAM 23 (Step 205 of FIG. 6). After this writing back process, vehicle condition data 60d remaining in memory region 23e at the very end of RAM 23 is cleared (Step 206).

The above clearing process in Steps 204 and 206 may be provided on an as needed basis. The program or data may be left as is without clearing as well.

In FIG. 5, vehicle condition data 60d is protected in a separate memory region of RAM 23, which is the same data storage medium. However, vehicle condition data 60d may be protected in a data storage medium separate from the RAM in CPU 21 of the vehicle body. For example, as illustrated in FIG. 1, construction machine 50 is equipped with data collection controller 20 and further equipped with a variety of controllers such as communication controller 30, engine controller 20, and the like. For this reason, vehicle condition data 60d may be alternately protected from data collection controller 20 in a data storage medium in a separate controller via communication circuit 51 in the vehicle during overwriting such that, after the overwriting process is completed, vehicle condition data 60d can be taken from the separate controller to write back (sic, restore) in the original data region 23b of RAM 23 in data collection controller 20.

In the above embodiment, vehicle condition data 60d is protected in a separate memory region. However, it is not always required to protect the data in a separate region as long as vehicle condition data 60d is not reset.

That is, as illustrated in FIG. 4, data region 23b of RAM 23 may be designated to be the unwritable region while temporary region 23d of RAM 23 may be designated the writable region. New vehicle program 60 transmitted from overwriting specific server 3 is temporarily buffered in overwritable temporary region 23b but it is not buffered in unwritable data region 23b. Therefore, there is no chance that vehicle condition data 60d stored in data region 23b is inadvertently reset during overwriting.

In the above embodiment, normal operation and overwriting are processed by each of the two servers. However, normal operation and overwriting may be processed by a single server. For example, both normal operation and overwriting may be provided by normal operation server 2.

FIG. 9 illustrates the procedure for switching the normal operation mode and the overwriting mode between normal operation server 2 and construction machine 50.

In this case, the two transport layer protocols, UDP and TCP, are prepared for communication protocols to take advantage of the application program of the normal operation server 2 and that of the construction machine 50.

As a result, when data is transmitted from normal operation server 2 in accordance with the UDP communication protocol, communication controller 30 of the construction machine 50 establishes a link with the UDP application program and invalidates the other link with the TCP application program (Yes pathway for Step 501). Then, communication controller 30 of construction machine 50 determines that communication controller 30 is in the normal operation mode, when it executes normal operation processing via data collection controller 20 (Step 503). In contrast, when data is transmitted from normal operation server 2 in accordance with the TCP communication protocol, communication controller 30 of the construction machine 50 establishes a link with the TCP application program and invalidates the other UDP application program (Yes pathway for Step 502). Then, communication controller 30 of construction machine 50 determines that communication controller 30 is in the overwriting mode, when it executes the overwriting process via data collection controller 20 (Step 504).

When two servers are installed, one of the servers may be designated as the primary server while the other server may be designated as the secondary server. For example, one server may perform both normal operation and overwriting: saving the secondary server for normal operation and overwriting which still needs to be done when the primary server is being serviced. The communication links between the two servers and construction machines may be switches in the same manner as described in the above embodiment.

This embodiment assumes construction machine 50 is in a vehicle. The present invention may be applied to any type of vehicle including a general purpose vehicle that requires overwriting of a vehicle program.

What is claimed is:

1. A server switching controller in which a first server and a second server are connected to a common communication controller installed in a machine or vehicle via communication means to communicate with each other;

said first server and said second server each having a server ID and an address ID1, ID2 respectively, for identifying each server; with said common communication controller having a controller ID and an address ID3 corresponding to the first server ID and an address 1D4 corresponding to the second server ID such that the common communication controller can communicate only with the first server when set at the address of the first server and can only communicate with the second server when set at the address of the second server;

and program means having a first program for recognizing the existence of a mismatch in the address of the server connection between the first server and the common communication controller such that before communication commences with the first server, the setting of the address in the common communication controller is switched to the address of the second server to permit the second server to send overwrite data to the common communication controller and to switch the address for communicating with the first server after a fixed duration of time has elapsed to allow for the completion of the transmission of said overwrite data or when the program means recognizes that the overwrite communication from the second server is completed.

2. The server switching controller as set forth in claim 1 wherein said first server is a normal operation server which transmits and receives data associated with machine and/or vehicle operating conditions to and from said controller during a normal mode of operation, and wherein said second server is an overwriting server that sends a new program to be written over the first program in the controller of the machine and/or vehicle when switched by said program means into an overwrite mode of operation.

3. The server switching controller as set forth in claim 2, wherein said first program will identify a mismatch between the address and server ID numbers of said first server and said second server for reconnecting the controller to the first server.

* * * * *